United States Patent
Rose

(10) Patent No.: US 10,693,978 B2
(45) Date of Patent: *Jun. 23, 2020

(54) SYSTEMS AND METHODS FOR DATA ROUTING MANAGEMENT

(71) Applicant: COMCAST CABLE COMMUNICATIONS, LLC, Philadelphia, PA (US)

(72) Inventor: David Rose, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,622

(22) Filed: Feb. 15, 2019

(65) Prior Publication Data
US 2019/0320031 A1    Oct. 17, 2019

Related U.S. Application Data

(63) Continuation of application No. 15/637,566, filed on Jun. 29, 2017, now Pat. No. 10,257,290, which is a continuation of application No. 14/532,276, filed on Nov. 4, 2014, now Pat. No. 9,736,248.

(51) Int. Cl.
*H04L 29/08* (2006.01)
*H04L 29/12* (2006.01)

(52) U.S. Cl.
CPC ............ *H04L 67/16* (2013.01); *H04L 61/103* (2013.01); *H04L 67/1012* (2013.01)

(58) Field of Classification Search
CPC .... H04L 67/16; H04L 61/103; H04L 67/1012
See application file for complete search history.

(56) References Cited

U.S. PATENT DOCUMENTS

| 6,609,213 B1 | 8/2003 | Nguyen et al. |
| 9,432,298 B1 | 8/2016 | Smith |
| 9,736,248 B2 | 8/2017 | Rose |
| 10,257,290 B2 | 4/2019 | Rose |
| 2003/0160815 A1* | 8/2003 | Muschetto ............ G06F 3/0481 715/733 |

(Continued)

OTHER PUBLICATIONS

U.S. Appl. No. 14/532,276, filed Nov. 4, 2014, David Rose.
U.S. Appl. No. 15/637,566, filed Jun. 29, 2017, David Rose.

*Primary Examiner* — El Hadji M Sall
(74) *Attorney, Agent, or Firm* — Ballard Spahr LLP

(57) ABSTRACT

Methods and systems for data routing management are disclosed. A method can comprise a system receiving a request directed to an address. The system can determine performance capabilities of a first logical grouping of computing devices, wherein the first logical grouping of computing devices share the address. The system can determine whether at least one computing device of the first logical grouping of computing devices can receive the request. If at least one computing device of the first logical grouping of computing devices can receive the request, the request can be transmitted to the at least one computing device of the first logical grouping of computing devices. If at least one computing device of the first logical grouping of computing devices cannot receive the request, the request can be transmitted to a second logical grouping of computing devices that share the address.

23 Claims, 9 Drawing Sheets

(56) References Cited

U.S. PATENT DOCUMENTS

| | | | |
|---|---|---|---|
| 2006/0036763 A1* | 2/2006 | Johnson | H04L 45/04 709/238 |
| 2007/0143395 A1* | 6/2007 | Uehara | G06F 13/385 709/203 |
| 2009/0129580 A1 | 5/2009 | Terpstra et al. | |
| 2012/0209650 A1* | 8/2012 | Romagnino | G06Q 10/06 705/7.15 |
| 2016/0127480 A1 | 5/2016 | Rose | |
| 2017/0374163 A1 | 12/2017 | Rose | |

\* cited by examiner

SYSTEMS AND METHODS FOR DATA ROUTING MANAGEMENT

CROSS REFERENCE TO RELATED APPLICATION

This application is a continuation of U.S. application Ser. No. 15/637,566, filed Jun. 29, 2017, which is a continuation of U.S. application Ser. No. 14/532,276, filed Nov. 4, 2014, and granted as U.S. Pat. No. 9,736,248 on Aug. 15, 2017, which is herein incorporated by reference in their entireties.

BACKGROUND

In a data routing system, computing devices utilize one or more communication networks to exchange data. As an example, two communication processing systems are often paired to receive and route an incoming communication request, a failure by one of the pair of communication processing system can result in a communications failure. For these and other types of systems and networks, more efficient data routing management mechanisms are needed.

SUMMARY

It is to be understood that both the following general description and the following detailed description are exemplary and explanatory only and are not restrictive, as claimed. In an aspect, provided are signaling systems and methods that provide for one or more of, geographic redundancy, cluster redundancy, global single signaling address scopes, cluster intelligence, and node awareness.

Provided are methods and systems for data routing management. In an aspect, a communication processing system can receive a communication request directed to an address that is shared by a first logical grouping of computing devices. The communication processing system can determine one or more performance capabilities of the first logical grouping of computing devices that share the address. The communication processing system can determine whether at least one computing device of the first logical grouping of computing devices can receive the communication request based on the determined one or more performance capabilities. If at least one computing device of the first logical grouping of computing devices can receive the communication request, the communication request can be transmitted to the at least one computing device of the first logical grouping of computing devices. If at least one computing device of the first logical grouping of computing devices cannot receive the communication request, the communication request can be transmitted to a second logical grouping of computing devices that share the address.

In an aspect, an example method can comprise a computing device in a first logical grouping of logical devices receiving a communication request directed to an address. The computing device can determine one or more performance capabilities of a first logical grouping of computing devices. The first logical grouping of computing devices can share the address and the computing devices can each be associated with respective device identifiers (e.g., media access control addresses). The computing device can determine at least one computing device of the first logical grouping of computing devices to receive the communication request based on the determined one or more performance capabilities. The computing device can transmit the communication request to the determined at least one computing device according to the respective device identifier of the determined at least one computing device.

In another aspect, an example system can comprise a first logical grouping of computing devices, a communication processing system, and a communication management system. In an aspect, the first logical grouping of computing devices can share an address, and each computing device of the first logical grouping of computing devices can be associated with a respective device identifier and performance metrics. In an aspect, the communication processing system can be coupled to the first logical grouping of computing devices. The communication processing system can be configured for receiving a communication request directed to the address shared by the first logical grouping of computing devices. The communication processing system can determine one or more performance capabilities of the first logical grouping of computing devices. The communication processing system can determine whether at least one computing device of the first logical grouping of computing devices can receive the communication request based on the determined one or more performance capabilities. Specifically, if at least one computing device of the first logical grouping of computing devices can receive the communication request, the communication request can be transmitted to the at least one computing device of the first logical grouping of computing devices. If at least one computing device of the first logical grouping of computing devices cannot receive the communication request, the communication request can be transmitted to a second logical grouping of computing devices that share the address. In an aspect, the communication management system can be connected to the first logical grouping of computing devices and the communication processing system. The communication management system can be configured for receiving the performance metrics of the first logical grouping of computing devices, and updating the one or more performance capabilities of the first logical grouping of computing devices based on the performance metrics.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
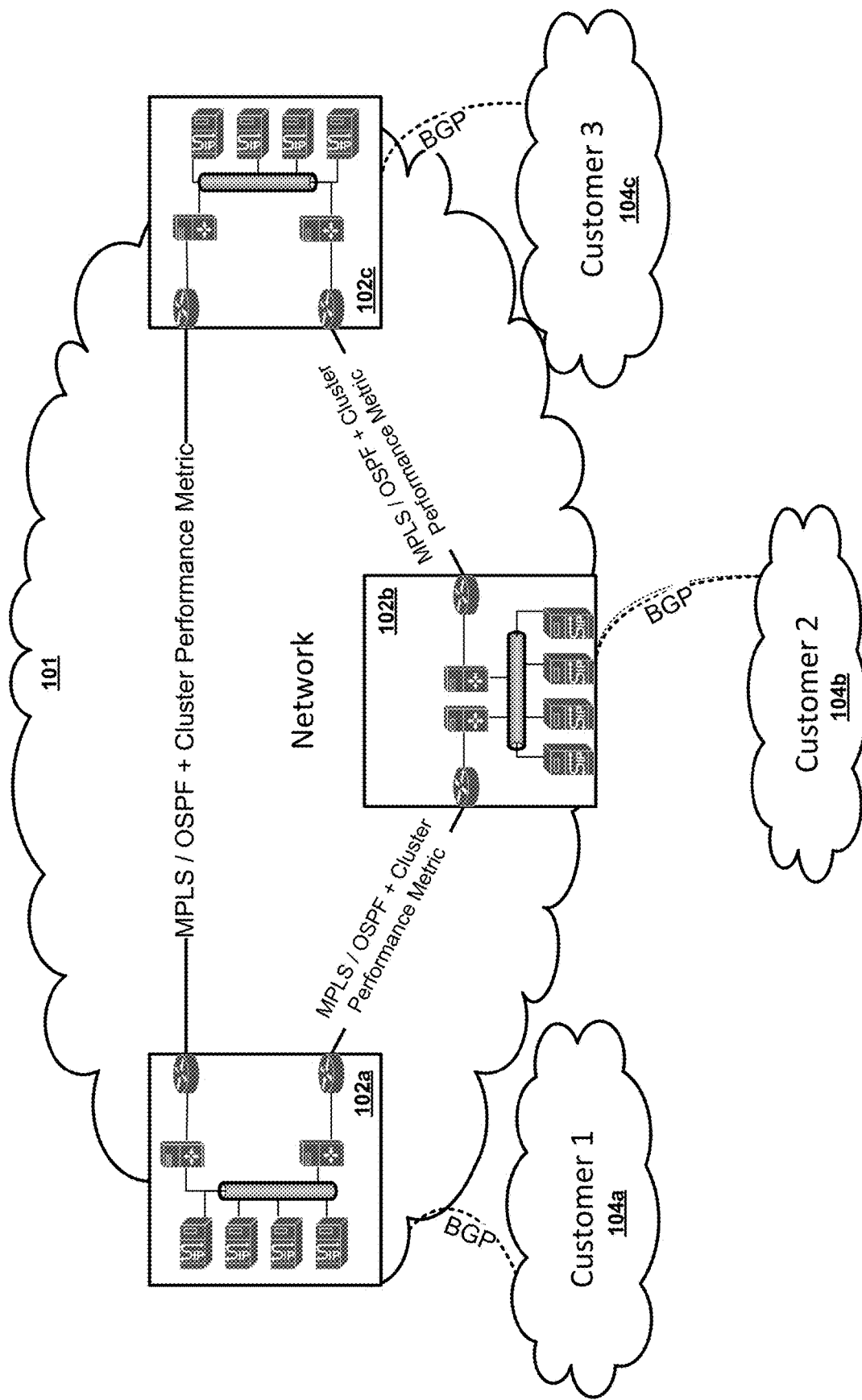
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to systems and methods for data routing management. In one aspect of the disclosure, a system can be configured to provide services, such as network-related services to a user device. It should be noted the present disclosure can be applicable in any network environment employing a computing device, a server, a user device or other network entity that is involved in the management of communication sessions between devices on a network. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

By implementing the disclosed systems and methods, a user device can transmit a communication request to a first logical grouping of computing devices via connecting to a single address (e.g., shared common address). A communication management system and a communication processing system can enable the communication request to be routed to computing devices available for processing the communication request. As such, if one computing device of the first logical grouping of computing devices is not available to receive the communication request, the communication request can be transferred to another computing device in the first logical grouping of computing devices that is available for processing the communication request. Alternatively, the communication request can be transferred to a second logical grouping of computing devices. In an aspect, each of the plurality of devices can be distinguished by their respective device identifiers which can be unique to each computing device (e.g., MAC addresses). The disclosed systems and methods can be used for communication requests such as internet telephone calls (e.g., VoIP), multimedia access and distribution, and multimedia conferences and presentations. In an aspect, the communication request can be distributed across multiple communication management systems, while maintaining appearance of a single IP address (e.g., to the requesting device, to the communication management systems, to other devices in the network). The disclosed methods and system can enable dynamic swapping between the multiple communication management systems for routing data.

FIG. 1 is a block diagram illustrating an example system. The system can implement a next generation cloud voice architecture 101. For example, the present methods and systems can comprise a cloud based session initiation protocol (SIP) signaling architecture that will allow for the deployment of session managers (e.g., SIP signaling servers) in a cloud computing environment, such as an OpenStack environment. In an aspect, the present methods and systems can be configured for geographic redundancy, cluster redundancy, global single signaling address scopes, cluster intelligence (e.g., Node Awareness), and/or the like as described further herein.

In an aspect, the present methods and systems can be configured to provide geographic redundancy. The system can be configured to support multiple session manager clusters 102a,b,c (e.g., or session manager farms) such that should an outage make the entire cluster 102a unavailable, secondary clusters 102b and/or tertiary clusters 102c can process incoming and outgoing requests. As an example, a session manager cluster can comprise one or more routers, one or more session switches, one or more session managers (e.g., communication server, SIP server), and/or the like. For example, the session manager clusters 102a,b,c can be configured to communicate across a network using various protocols such as Multiprotocol Label Switching (MPLS), Open Shortest Path First (OSPF) protocol, Internet Protocol (IP), and/or the like. For example, session manager clusters 102a,b,c can communicate with other session manager clusters 102a,b,c over the network via MPLS, OSPF, Internet Protocol (IP), and/or the like. As described further herein, session manager clusters 102a,b,c can communicate performance metrics, hand off call sessions, and/or perform other communication using the network. Though various protocols and values are shown in FIG. 1, it should be understood that the present methods and systems are not limited to such protocols and values but can be implemented using other protocols and values.

In an aspect, the present methods and systems can be configured to provide cluster redundancy. For example, each session manager cluster 102a,b,c can be configured to share a single or multiple IP address scopes such that devices signaling to the cluster can use only a single signaling IP address for communication to the cluster. The session manager clusters 102a,b,c can be configured to support health statistics, performance statistics, and/or utilization statistics per node within the cluster and share this information with one or more (or each) node within a session manager cluster. One or more (or each) session manager cluster 102a,b,c can be configured to collect the metrics from one or more (or each) node within the session manager cluster and share this aggregate information with other clusters.

In an aspect, the present methods and systems can provide global signaling address scopes. For example, the system can be configured with customer 104a,b,c facing signaling IP addresses that are global in nature. This configuration can be accomplished with border gateway protocol (BGP) and/or autonomous systems path (AS-Path) prepending advertisements to customers. Each customer 104a,b,c can be associated with a preferred session manager cluster 102a to which the customer will signal to as well as secondary session manager clusters 102b and/or tertiary session manager clusters 102c. A customer 104a,b,c may have two or more session manager clusters 102a,b,c to which the customer signals to for geographic preference of call termination into the network or termination into the network.

In an aspect, the present methods and systems can be implemented, at least in part, at Layer 2 (e.g., the data link layer) of the Open Systems Interconnection Reference Model (OSI model). Layer 2 options can comprise 802.1Q VLAN tagging and Link Aggregation Control Protocol 801.AX. The latter can bond a single IP address to multiple physical interfaces on a single system for port redundancy and increase throughput. The system can be configured to span the LAG across multiple systems such that each system can accept incoming IP traffic, specifically SIP traffic, on any member systems within the node session manager cluster 102a,b,c. The system can be configured to keep active IP sessions active. Based on node performance metrics, the node handling the active sessions can be configured to communicate that the node can take no more traffic or that the node desires to offload traffic to another node. For example, the system can comprise a one or more session switches (e.g., downstream switch) configured to store multiple MAC addresses in a MAC table and track active IP sessions for the MAC addresses. For example, each of the session manager clusters 102a,b,c can comprise a session switch. As another example, a session switch can be utilized by multiple session manager clusters 102a,b,c. The MAC table or tables can be configured to classify MAC address as GREEN, YELLOW, or RED or other similar classification system. For example, GREEN can designate that the device associated with a MAC address is available for receiving new IP sessions. YELLOW can indicate that the device associated with a MAC address can only pass existing sessions. RED can indicate that all sessions being handled by a device are to be transitioned to another MAC address. The designator in this case would be the active node or standby node within the session manager cluster.

In an aspect, the present methods and systems can be implemented, at least in part, at Layer 3 (e.g., network layer) and/or Layer 7 (e.g., application layer) of the OSI model. The session switch for a session manager cluster 102a,b,c can be configured to be layer 3 and/or layer 7 aware. For example, a SIP call can have multiple messages which may not be tracked simply by a session, so when a node determines to offload calls, or stop receiving new calls, the session switch can be configured to determine the call state. In an aspect, the session switch can be configured with layer 2 functionality and call awareness. The session switch may not be an Ethernet switch but rather a server configured serve the sessions to the session manager cluster 102a,b,c and receive messages from the nodes within the session manager cluster as to which MAC addresses are identified as GREEN, YELLOW, or RED. At a minimum, the system can be configured to track and associate the Call ID with the MAC address tables.

For redundancy, session switches can be deployed in pairs. In this configuration, the globally advertised signaling IP or IPs can be assigned to each session switch. The uplink can be a direct uplink to a UR which can be configured with weighted static routes. If the preferred route interface goes down, the secondary session switch can be configured to receive the inbound sessions.

Figure 2:
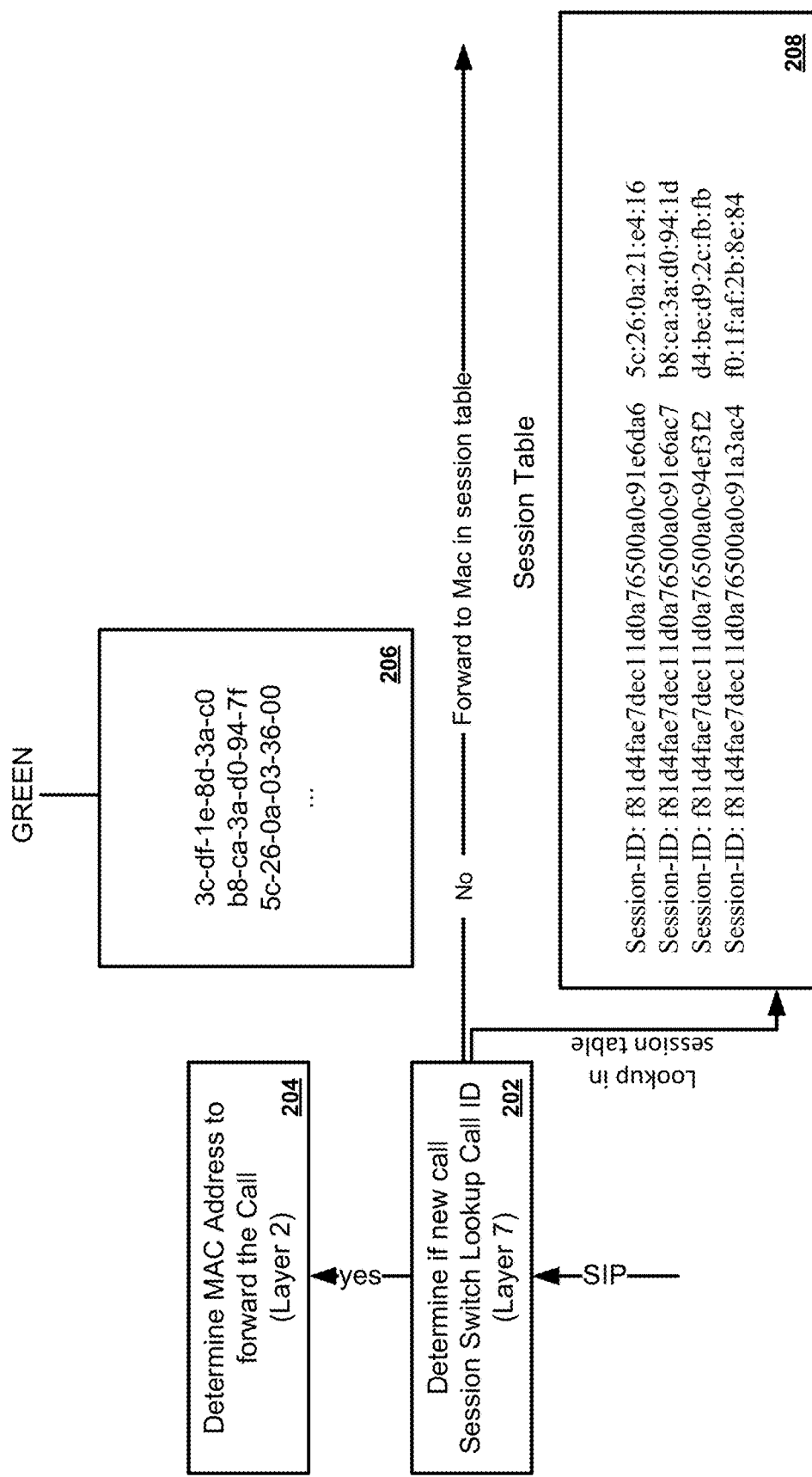
FIG. 2 is a block diagram illustrating example logic.

FIG. 2 is a block diagram illustrating example logic of a session switch. It should be noted that for purposes of illustration example values are shown in FIG. 2, but the present methods and systems are not limited to these example values. At block 202, the session switch can receive a SIP communication. The session switch can retrieve, request, lookup other otherwise determine a Call ID in a session table based on the SIP communication. The session switch can determine if the call is a new call. If the call is not a new call, then the SIP communication can be forwarded to a MAC address found in session table. If the call is a new call, the session switch can proceed to block 204. At block 204, the session switch can determine to which MAC addresses the call should be forwarded.

At block 206, a green table is shown with MAC address associated with a green status. The green table can be updated by the active session manager. The session switch can choose the first MAC address in the list of the green table. If the device associated with the first MAC address on the list is not responsive, the session switch can then try the next MAC address and so on.

At block 208, an example session table is shown. For example the session table can comprise session identifiers (ID) associated with MAC addresses. It should be noted that tabs were used to separate values for readability purposes. Actual formatting in the session table may be different.

In an aspect, the present methods and systems can be configured with cluster intelligence. Each cluster of session managers will have knowledge of the cluster's own key performance indicators (KPIs), such as CPU Utilization, available RAM, available disk space, total sessions, CPS, Layer 2 errors, Layer 3 errors, and/or the like. Additional metrics utilized by the present methods and systems. The session managers can comprise a table of KPIs for each node within the session manger's cluster. The current active node can be configured to make decisions on which node to offload new calls to when node decides the node is no longer available. The current active node can select a node to offload new calls to pre-defined preferred node or nodes, based on the most preferable node by evaluating each KPI table for each node, and/or other similar approaches. For example, this evaluation can be performed each time the heartbeat that carries the KPIs to each other node. Both, the active and standby node can be configured to run the algorithm, determine the successors, and place this information in their respective node Performance Metric (PM) tables.

The session manager cluster can be configured to exchange heartbeat information (e.g., regular communication of information) with one or more (or each) other clusters. The nodes compiling the remote and local cluster KPIs can be the active nodes and/or standby nodes. Keeping track of cluster health across clusters enables each cluster to determine to which cluster offloaded calls can be sent for load balancing. The KPIs used in the algorithm can be configured as percentage based metrics based on total available resources and predefined integers for each KPI. This configuration can be utilized for inter-cluster load balancing as well as intra-cluster load balancing.

Each node within a cluster can be configured with access to all routes, SIP manipulation rules, SDP manipulation rules, and/or the like. The database can be internal or external to the node, but it is preferred that the database be external, but local to each cluster and be deployed in a redundant fashion.

Figure 3:
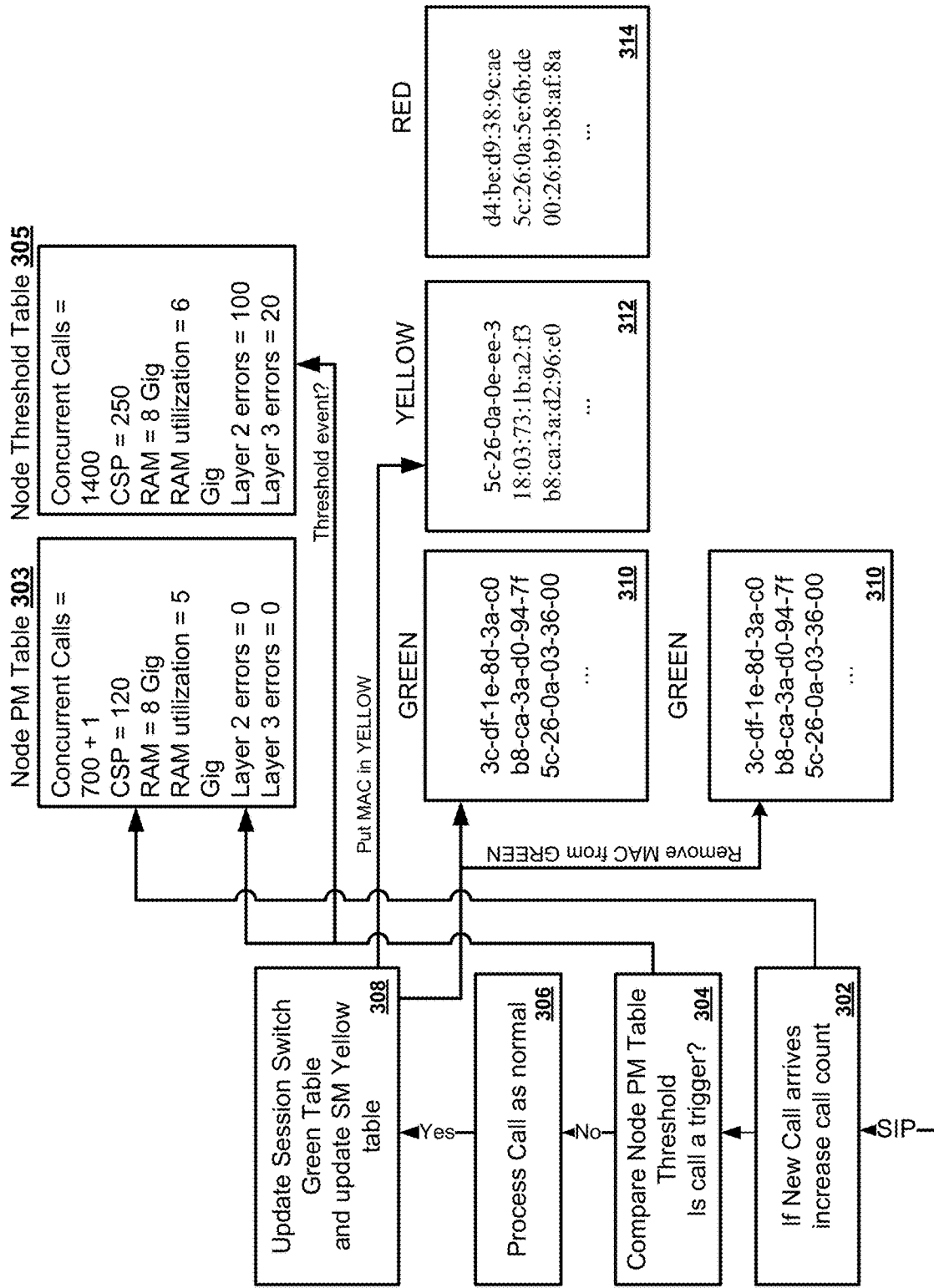
FIG. 3 is a block diagram illustrating example logic.

FIG. 3 is a block diagram illustrating example logic of a session manager (e.g., a node of the session manager cluster). It should be noted that for purposes of illustration example values are shown in FIG. 3, but the present methods and systems are not limited to these example values. At block 302, a SIP communication (e.g., call) can arrive at a session manager. The session manager can increase the current call count in a node PM table 303. The node PM table can comprise values for concurrent calls, CSP, RAM, RAM utilization, layer 2 errors, layer 3 errors, and/or the like. At block 304, the session manager can determine whether a threshold has been met based on information stored in a node threshold table 305. For example, the node threshold table 305 can comprise thresholds that correspond to values of the node PM table 302. Example thresholds can comprise concurrent calls, CSP, RAM, RAM utilization, layer 2 errors, layer 3 errors, and/or the like. At block 306, SIP communication can be processed. At step 308, the session switch can update one or more additional tables. For example, the session switch can update the green table 310, yellow table 312, and/or red table 314. For example, a MAC address can be removed from the green 310 table and added to the yellow table 312.

Figure 4:
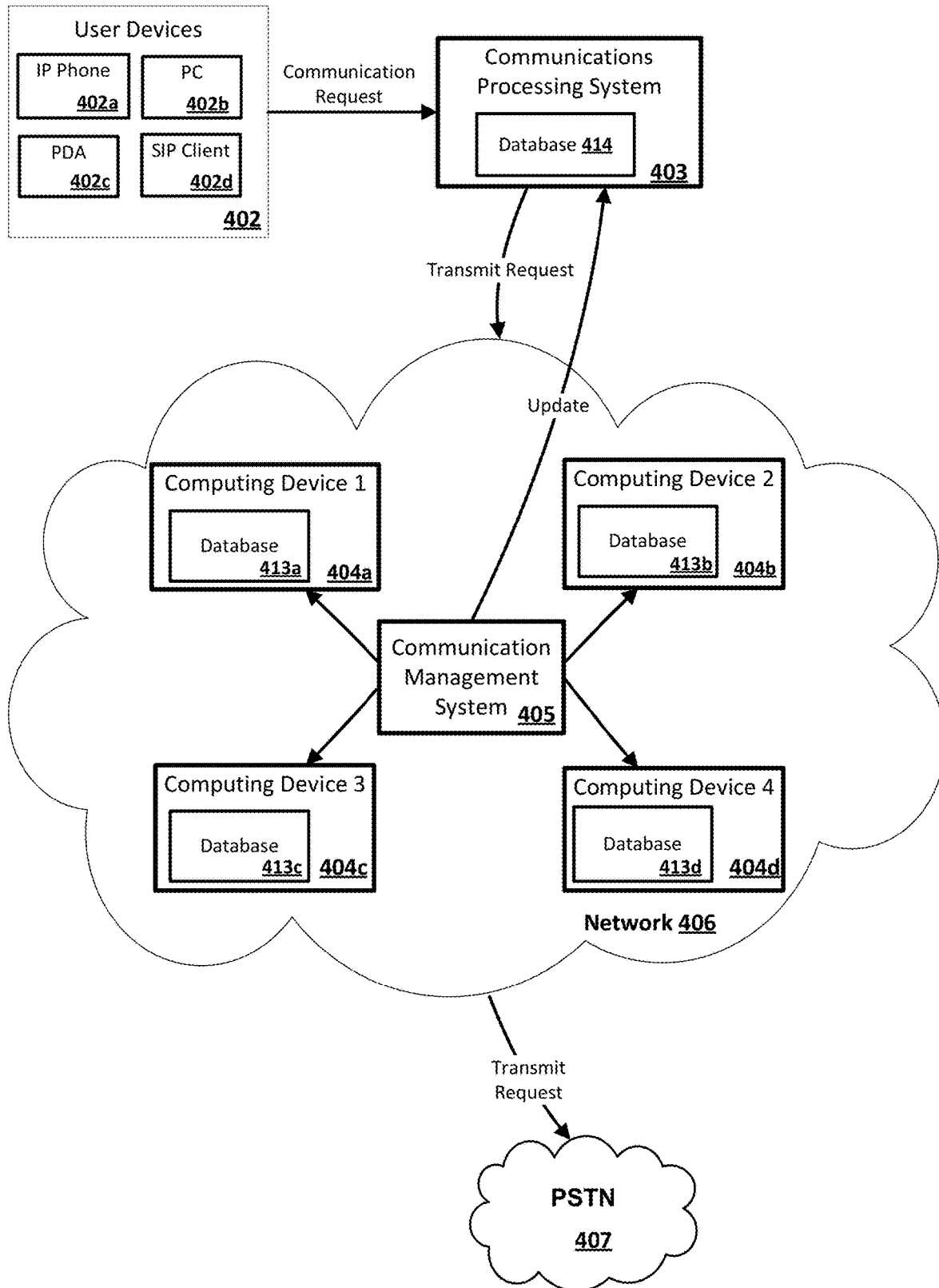
FIG. 4 is a block diagram of an exemplary system.

FIG. 4 is a block diagram illustrating an example data routing management system according to one or more aspects of the present disclosure. As an example, the system can comprise a plurality of user devices 402a,b,c,d, a grouping of a plurality of computing devices 404a,b,c,d, a communication processing system 403, and a communication management system 405. As an example, the plurality of computing devices 404a,b,c,d, communication processing system 403 and/or communication management system 405 can comprise the session switch, session manager, and/or the like described with FIG. 1, FIG. 2, and FIG. 3. In an aspect, the grouping of computing devices can be a logical grouping. In some implementations the communication management system 405 and/or communication processing system 403 can be implemented one or more of the plurality of computing devices 404a,b,c,d.

The logical grouping of computing devices 404a,b,c,d can be connected via the network 406 and share one address (e.g., IP address). For example, the sharing of the address can be accomplished by associating (e.g., in a routing table or other database or table) each of the computing devices 404a,b,c,d in the logical group of computing devices with the address. The sharing of the address can be accomplished by a management device, such as the communication management system 405 configured to process communication requests associated with an address by selectively sending requests associated with a an address to one or more of the computing devices 404a,b,c,d in the logical group of computing devices. In another aspect, sharing the address can be accomplished by use of labeling and/or other network routing technique. In another aspect, sharing an address can comprise appearing to share the same address. For example, communication messages sent to the address can appear (e.g., from the perspective of the device sending the message, from the perspective of the communication management system 405, from the perspective of the communication processing system 403) to be directed to the address, received and processed by a single device at the address (e.g., though multiple different devices may receive and/or process messages and/or communications requets directed to the address during the same communication session), and/or the like. As an example, sharing an address can be achieved by border gateway protocol (BGP) and autonomous systems (AS) path. In one aspect, a logical group of computing devices can share an address with one or more other logical groups of computing devices.

As a further example, sharing the address can be accomplished as follows. The communication processing system 403 can be configured to receive an inbound communication request (e.g., IP communication request) from a user device 402. The communication processing system 403 can then remove a header (e.g., address header, IP header) in the inbound communication request and forward a data packet in the inbound communication request (e.g., Ethernet packet) to an appropriate port of a communication management system (e.g., communication management system 405) according to one or more performance capabilities (e.g., availability) of the plurality of computing devices (e.g., computing device 404a) connected to the communication management system (e.g., 405).

In an aspect, each computing device of the logical grouping of computing devices 404a,b,c,d can be associated with a respective device identifier. As an example, a device identifier can comprise an identifier that uniquely identifies a computing device (e.g., a media access control (MAC) address).

As an example, in a telephone communication system, user devices 402, such as IP phones 402a, personal computers (PCs) 402b, personal data assistants (PDAs) 402c, and a SIP client 402d, can be configured to communicate with a communication processing system 403. For example, user devices 402a,b,c,d can transmit a communication request to the communication processing system 403. The communication request can be directed to the logical grouping of computing devices according to the address (e.g., IP address) that the logical grouping of computing devices share. The communication request can be transmitted via a signaling communications protocol such as session initiation protocol (SIP). Although illustrated in a cluster, user devices 402a,b,c,d can be mobile or stationary, and located throughout a network. The user devices 402a,b,c,d can comprise IP phones, PSTN phones, SIP soft clients, residential voice gateways, other IP clients, such as Skype, MSN Messenger, office communicator, PDAs, VoIP enabled personal computers or a VoIP adapter, and the like.

In an aspect, the communication processing system 403 can serve as an edge server between user devices 402a,b,c,d and the logical grouping of computing devices 404a,b,c,d. In an aspect, the communication processing system 403 can be on the border between a communication service provider and its user devices (e.g., provide a user network interface (UNI)). In another aspect, the communication processing system 403 can be on the border between two communication service providers (e.g., provide network-to-network interface (NNI)). As an example, the communication processing system 403 can be employed as an NNI when a communication session requestor uses a different communication service than the user devices being requested for a communication session. In another aspect, in an IP-multimedia subsystem (IMS) network, the communication processing system 403 can provide call session control and border gateway functions at UNI and NNI points. In another aspect, the communication processing system 403 can also be used to perform a topology-hiding function to prevent user devices or other communication service providers from learning details about how a network (e.g., network 406) is configured or how communications placed through the network are routed.

In an aspect, the communication processing system 403 can be associated with a database 414. The database 414 can comprise one or more performance capabilities of the logical grouping of computing devices 404a,b,c,d. For example, the database 414 can comprise a list of computing devices within the network 406 available for processing the communication request, a list of computing devices available for routing the communication request to a computing device available for processing the communication request, and a list of computing devices not available for processing or routing the communication request.

In an aspect, the logical grouping of computing devices 404a,b,c,d can be configured to process and/or route a communication request received via the communication processing system 403. In an aspect, the logical grouping of computing devices 404a,b,c,d can comprise respective databases 413a,b,c,d. The database 413a,b,c,d can store performance metrics and predefined performance thresholds for the respective computing devices 404a,b,c,d. Performance metrics can be compared with the predefined performance thresholds. When a performance threshold is exceeded, one or more performance capabilities of a computing device can be change from one category to another category.

In an aspect, the logical grouping of computing devices 404a,b,c,d can comprise one or more communication protocol servers. The logical grouping of computing devices 404a,b,c,d can operate as a server (a proxy server, a communication management server, an application server, etc.), a gateway node (a session border controller (SBC), a media gateway control function ((MGCF), etc.), or a data management unit (e.g., an intelligent routing database (IRDB)). In an aspect, the logical grouping of computing devices 404a,b,c,d can be used to establish mutually acceptable administrative procedures between different networks. Some example of networks and systems include a public switched telephone network (PSTN) system, a public land mobile network (PLMN) system, wireless distribution systems, wired or cable distribution systems, coaxial cable distribution systems, ultra high frequency (UHF) or very high frequency (VHF) radio frequency systems, satellite or other extra-terrestrial systems, cellular distribution systems, power-line broadcast systems, fiber optic networks, and any combinations of these systems and/or networks. Accordingly, the computing devices 404a,b,c,d can comprise devices, such as protocol translators, impedance matching devices, rate converters, fault isolators, and/or signal translators as necessary to provide system interoperability.

The communication management system 405 can be configured to receive the performance metrics of the logical grouping of computing devices 404a,b,c,d. In an aspect, the performance metrics can comprise one or more performance metrics for each individual computing device, statistical performance metrics for each individual computing device, historical performance metrics for each individual computing device, and/or the like. The performance metrics can comprise performance metrics for the logical grouping of computing devices as a whole, statistical performance metrics for the logical grouping of computing devices as a whole, historical performance metrics for the logical grouping of computing devices as a whole, combinations thereof, and the like. As an example, when a particular performance metric has exceeded a predefined threshold, a computing device (e.g., computing device 404a) can provide (e.g., send, transmit, publish) the respective performance metric (e.g., number of active communication requests in processing, utilization status of CPU, utilization status of a RAM, error messages, etc.) and related data (e.g. computing device MAC address) to the communication management system 405. The communication management system 405 can then update the database 414 associated with the communication processing system 403. For example, database 414 can be updated when a computing device (e.g., computing device 404a) is moved from a list of devices available for processing a communication request, to a list of devices not available for routing a communication request.

As an example, the communication management system 405 can receive performance metrics of a computing device (e.g., computing device 404a) by a poll request. Specifically, the communication management system 405 can execute a poll request to the computing device 404a. The computing device 404a can hold the request until a performance threshold has been exceeded. When a performance metric exceeds the performance threshold, the computing device 404a can respond to the poll request of the communication management system 405 by sending the performance metric of the computing device 404a to the communication management system 405.

In an aspect, the logical grouping of computing devices 404a,b,c,d can process a communication request from a public or private network (e.g., network 406) and transmit the request to another public or private network, for example, a public switched telephone network (PSTN) 407. A communication session can be established when the communication request is transmitted from the user device (e.g., user device 402a) to a destination user device (not shown) in a public or private network, such as a PSTN network 407. After the communication request is processed and/or routed by a computing device (e.g., computing device 404a), the performance metrics (e.g., number of active communication requests in processing, utilization status of CPU, utilization status of a RAM, etc.) of the computing device (e.g., computing device 404a) can be updated. For example, the updated performance metrics can indicate that the computing device (e.g., computing device 404a) has more resources to process and/or route a new communication request.

In an aspect, the logical grouping of computing devices 404a,b,c,d can be associated with respective databases 413a,b,c,d. As an example, the databases 413a,b,c,d can comprise performance metrics and performance thresholds associated with respective computing devices 404a,b,c,d. For example, performance metrics can comprise utilization of CPU, RAM, disk space, total communication sessions in processing, calls per second (CPS), error messages (e.g., Layer 2 errors, Layer 3 errors), and the like. Other performance metrics can be included according to a specific network or system. As another example, the performance thresholds can be a trigger point as to when a computing device can be classified as available for processing a communication request, available for routing a communication request to a computing device available for processing the communication request, or not available for processing or routing a communication request. In an aspect, the communication management system 405 can monitor the information stored in databases 413a,b,c,d, and update the database 414 associated with the communication processing system 403, so that the communication processing system 403 can have updated knowledge of one or more performance capabilities of the logical grouping of computing devices 404a,b,c,d. In an aspect, the database 414 can be internal or external to the communication processing system 403, similarly, the databases 413a,b,c,d can be internal or external to the respective computing devices 404a,b,c,d. In an aspect, databases 413a,b,c,d, and 414 can be deployed in a redundant fashion.

In an aspect, a computing device of the logical grouping of computing devices (e.g., computing device 404a) can access performance metrics of other computing devices (e.g., computing device 404b,c,d) via communication with the communication management system 405. As an example, performance metrics of the logical grouping of computing devices 404a,b,c,d can be shared on a regular basis (e.g., on a heartbeat).

In an aspect, once a computing device (e.g., computing device 404a) receives a communication request from the communication processing system 403, the computing device can become an active computing device. In an aspect, the active computing device can determine one or more computing devices to route the communication request via evaluating one or more performance capabilities of the plurality of computing devices (e.g., computing devices 404b,c,d) within the network 406. In an aspect, a computing device can have access to routers, communication session (e.g., SIP) manipulation rules, and session description protocol (SDP) manipulation rules and other information necessary to process and routing a communication request.

Figure 5:
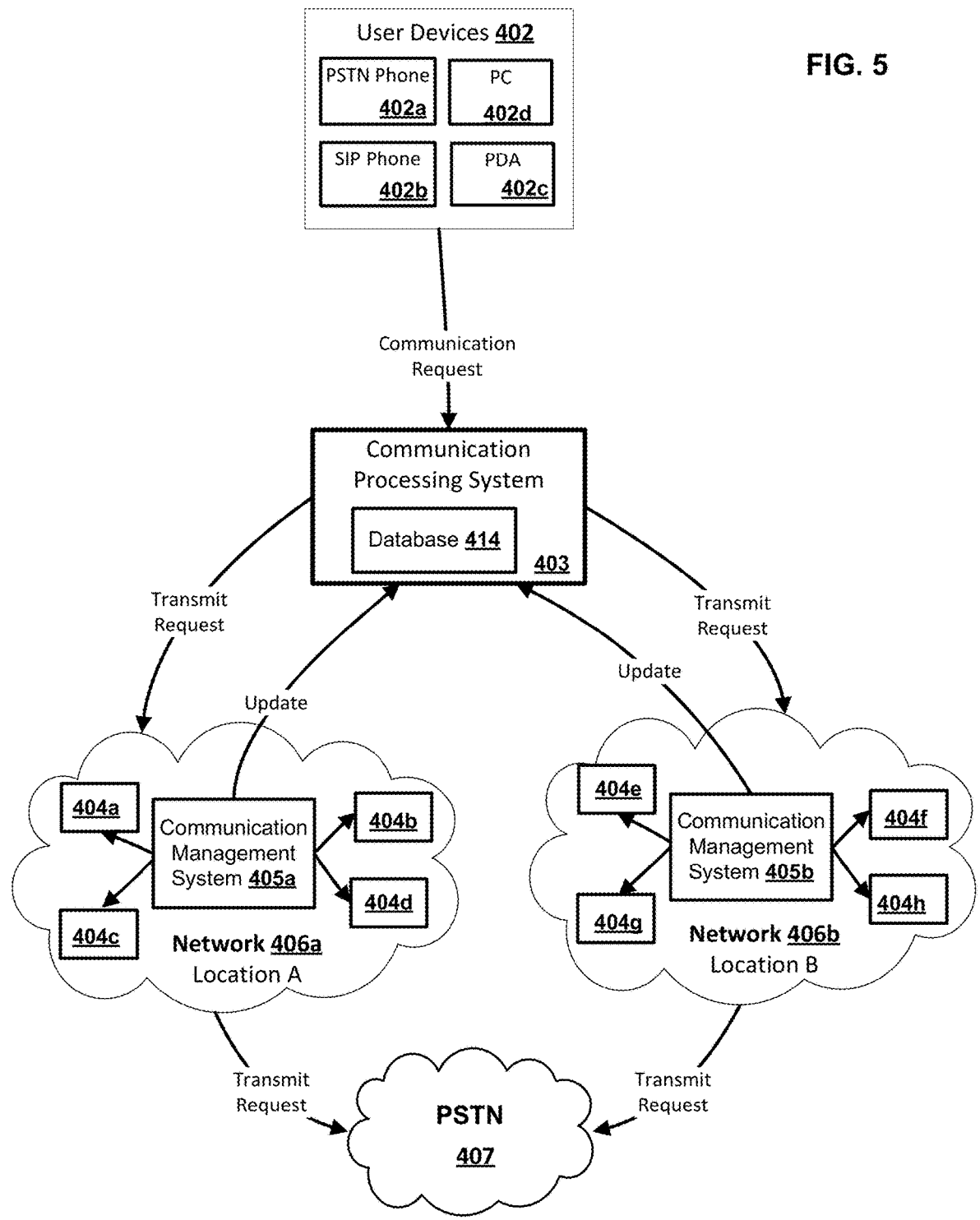
FIG. 5 is a block diagram of an exemplary system.

FIG. 5 illustrates another exemplary environment in which the present methods and systems can operate. In an aspect, an example system can have a first logical grouping of computing devices (e.g., computing devices 404a,b,c,d) connected via the network 406a at location A, a second logical grouping of computing devices (e.g., computing devices 404e,f,g,h) connected via the network 406b at location B, a communication processing systems 403, a communication management systems 405a corresponding to the first logical grouping of computing devices 404a,b,c,d, and a communication management systems 405a corresponding to the second logical grouping of devices 404e,f,g,h. Specifically, the communication management system 405a can be configured to receive the performance metrics of the first logical grouping of computing devices 404a,b,c,d, and the communication management system 405b can be configured to receive the performance metrics of the second logical grouping of computing devices 404e,f,g,h.

In an aspect, the communication management system 405a can be configured to receive the performance metrics of the first logical grouping of computing devices 404a,b,c,d. The communication management system 405b can be configured to receive the performance metrics of the second logical grouping of computing devices 404e,f,g,h. The communication management systems 405a and 405b can update the database 414 of the communication processing system 403 with the performance metrics of the first logical grouping of computing devices 404a,b,c,d and the performance metrics of the second logical grouping of computing devices 404e,f,g,h. Accordingly, the performance status of the first logical grouping of computing devices 404a,b,c,d and the performance status of the second logical grouping of computing devices 404e,f,g,h can be updated. As an example, the database 414 of the communication processing system 403 can comprise a list of computing devices available for processing the communication request, a list of computing devices available for routing the communication request to a computing device available for accepting a communication request, and a list of computing devices not available for processing or routing a communication request.

In an aspect, the first logical grouping of computing devices 404a,b,c,d and the second logical grouping of computing devices 404e,f,g,h can be configured to share an address (e.g., an IP address). As an example, sharing one IP address by a plurality of computing devices can be achieved by border gateway protocol (BGP) and autonomous systems (AS) path. In an aspect, the communication processing system 403 can be configured to receive an inbound IP communication request from a user device 402. The communication processing system 403 can then remove an IP header in the inbound IP communication request and forward a data packet in the inbound IP communication request (e.g., Ethernet packet) to an appropriate port of a communication management system (e.g., communication management system 405a, 405b) according to one or more performance capabilities (e.g., availability) of the plurality of computing devices (e.g., computing device 404a) connected to the communication management system (e.g., 405a, 405b). In an alternate embodiment, the first logical grouping of computing devices 404a,b,c,d and the second logical grouping of computing devices 404e,f,g,h can be configured to use separate addresses (e.g., IP addresses)

In an aspect, a logical grouping of computing devices (a cluster) can be configured as a primary cluster for a user device. As an example, the logical grouping of computing devices closest to the user device can be configured as the primary cluster. In an aspect, another logical grouping of computing devices can be configured as a secondary cluster for the user device when the primary cluster is not available. Accordingly, user device can transmit a communication request to a primary cluster by sending a communication request directed to an address (e.g., IP address) of the primary cluster. If the primary cluster is not available, the communication request can be transferred to a second cluster that shares the address (e.g., IP address) with the first cluster.

In an aspect, the communication processing system 403 can be used to determine a geographical location of a logical grouping of computing devices. For example, the communication processing system 403 can identify the location of the communication requestor (e.g., user device 402a) and determine a cluster closest to the user device (e.g., a primary cluster). As another example, the communication processing system 403 can determine a cluster with the most available performance capacity. Accordingly, the communication processing system 403 can transmit the communication request a determined cluster to further process the communication request.

In an aspect, the communication management system 405a and the communication management system 405b can exchange heartbeat information with each other. The exchanged information can keep track of the status of the respective logical groupings of computing devices (clusters), and therefore determine a cluster to receive a communication request for load balancing (e.g., inter-cluster load balancing). In another aspect, the communication management system 405a and the communication management system 405b can determine at least one computing device within the respective cluster to transmit the communication request for load balancing (e.g., intra-cluster load balancing).

Figure 6:
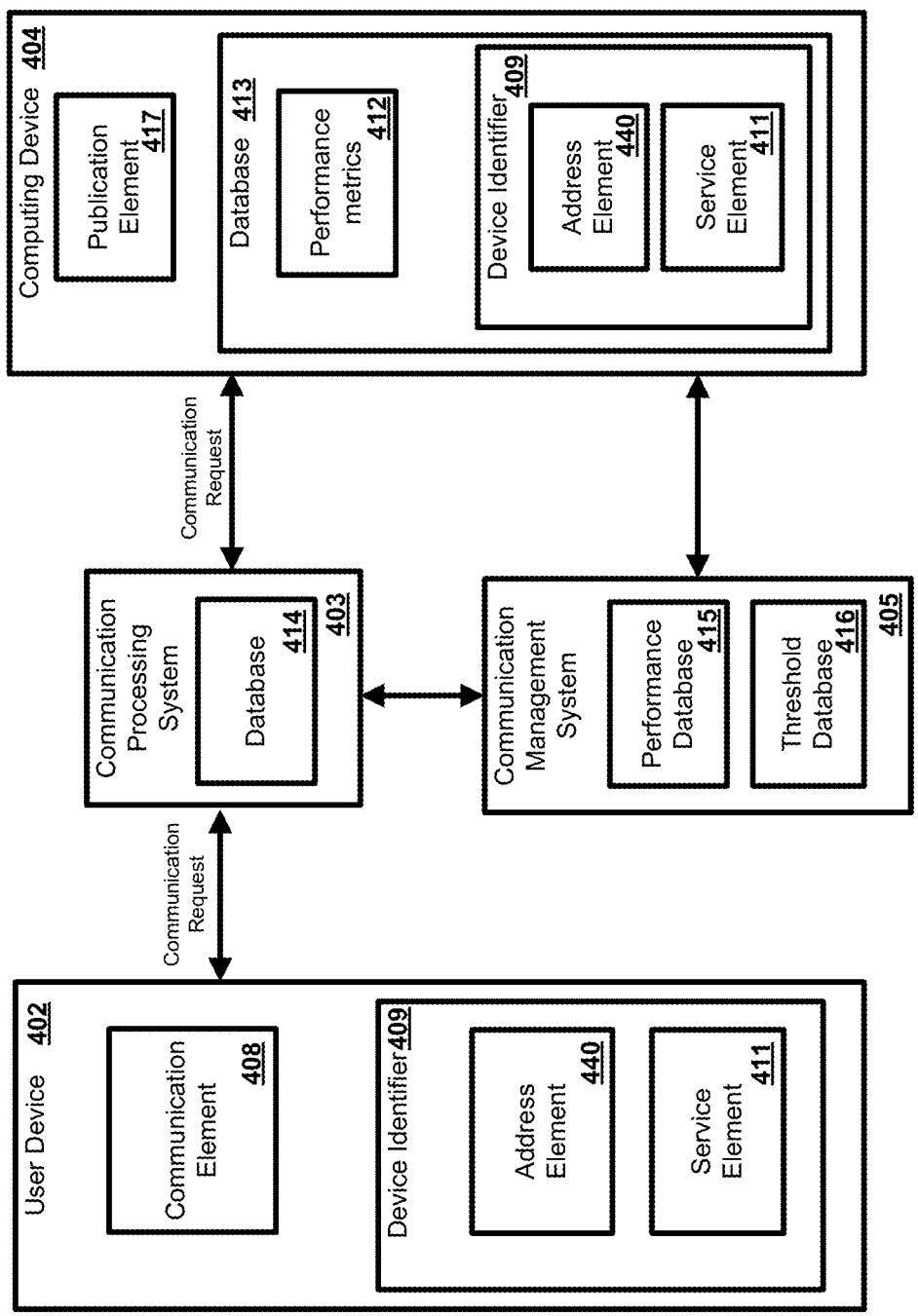
FIG. 6 is a block diagram of an exemplary system in which the present methods and systems can operate.

FIG. 6 illustrates various aspects of an exemplary environment in which the present methods and systems can operate. The network and system can comprise a user device 402, a communication processing system 403, a computing device 404 (such as a call communication processing server), and a communication management system 405. As an example, the user device 402 and the communication processing system 403 can be in communication via a private and/or public network, such as the Internet or a local area network. Other forms of communications can be used, such as wired and wireless telecommunication channels, for example, 1X, 3G, 4G, 4G LTE network. In an aspect, the communication processing system 403, the computing device 404 and/or the communication management system 405 can be configured as (or disposed at) a central location (e.g., a headend, or processing facility), which can receive content (e.g., data, input programming) from multiple sources.

In an aspect, the user device 402 can comprise an electronic device, such as a computer, a telephone, a VoIP phone, a smartphone, a laptop, a tablet, a set top box, a display device, or other device configured for communicating with the communication processing system 403. As an example, the user device 402 can comprise a communication element 408 for providing an interface to a user to interact with the user device 102. The communication element 408 can be any interface for presenting and/or receiving information to/from the user, such as user feedback. An example interface may be communication interface, such as a web browser (e.g., Internet Explorer, Mozilla Firefox, Google Chrome, Safari, or the like). Other software, hardware, and/or interfaces can be used to provide communication between the user and one or more of the user device 402 and the communication processing system 403. As an example, the communication element 408 can request or query various files and/or services from a local source and/or a remote source. As a further example, the communication element 408 can transmit data to a local or remote device, such as the communication processing system 403.

In an aspect, the user device 402 can transmit a communication request through a communication element 408. For example, the communication element 408 can provide an interface to a user to interact with the user device 402, the communication processing system 403, and/or the computing device 404. The communication element 408 can communicate with the communication processing system 403 synchronously or asynchronously over standard Internet protocols, such as hypertext transfer protocol (HTTP), session initiation protocol (SIP), media gateway control protocol (MGCP), border gateway protocol (BGP), real-time transport protocol (RTP), session description protocol, multiprotocol label switching (MPLS), open shortest path first protocol, inter-asterisk exchange (IAX), jingle XMPP VoIP extensions, one or more of the of protocols of the H.323 standard, and/or the like.

In an aspect, the user device 402 can be associated with a user identifier or device identifier 409. As an example, the device identifier 409 can be any identifier, token, character, string, or the like, for differentiating one user or user device (e.g., user device 402) from another user or user device. In a further aspect, the device identifier 409 can identify a user or user device as belonging to a particular class of users or user devices. As a further example, the device identifier 409 can comprise information relating to the user device, such as a manufacturer, a model or type of device, a service provider associated with the user device 402, a state of the user device 402, a locator, and/or a label or classifier. Other information can be represented by the device identifier 409. As an example, the user device 402 can be notified of a request for communication session by its device identifier 409.

In an aspect, the device identifier 409 can comprise an address element 410 and a service element 411. In an aspect, the address element 410 can comprise or provide an internet protocol address, a network address, a media access control (MAC) address, an Internet address, a telephone number, or the like. As an example, the address element 410 can be relied upon to establish a communication session between the user device 402 and the computing device 404 or other devices and/or networks. As a further example, the address element 410 can be used as an identifier or locator of the user device 402. In an aspect, the address element 410 can be persistent for a particular network. As an example, the user device 402 can be notified of a request for communication session by its address element 410.

In an aspect, the service element 411 can associate the device identifier 409 and/or address element 410 with a user and/or telephone numbers linked with the user. As an example, the user can be identified by user name, user account, and the like. As such, when the computing device 404 receives a request for a communication session with a user or telephone numbers linked with the user, some or all the user devices associated with the user or telephone numbers linked with the user can be notified simultaneously.

The service element 411 can comprise an identification of a service provider associated with the user device 402 and/or with the class of user device 402. The class of the user device 402 can be related to a type of device, capability of device, type of service being provided, and/or a level of service (e.g., business class, service tier, service package, etc.). As an example, the service element 411 can comprise information relating to or provided by a communication service provider (e.g., Internet service provider) that is providing or enabling data flow such as communication services to the user device 402. As a further example, the service element 411 can comprise information relating to a preferred service provider for one or more particular services relating to the user device 402. In an aspect, the address element 410 can be used to identify or retrieve data from the service element 411, or vice versa. As a further example, one or more of the address element 410 and the service element 411 can be stored remotely from the user device 402 and retrieved by one or more devices, such as the user device 402 and the computing device 404. Other information can be represented by the service element 411.

In an aspect, the computing device 404 can be a server for communicating with the user device 402. As an example, the computing device 404 can process, route a communication request from the user device 402. As an example, the computing device 404 can provide services, such as voice communications, network (e.g., Internet) connectivity, network printing, media management (e.g., media server), content services, streaming services, broadband services, or other network-related services. In an aspect, the computing device 404 can allow the user device 402 to interact with remote resources, such as data, devices and files. For example, the computing device 404 can receive an incoming communication request from a user device on another network. For example, the computing device 404 can manage communication between the user device 402 and one or more other user devices (not shown). In an aspect, the one or more other user devices can be the same type of device as the user device 402, such as a computer, a telephone, a VoIP phone, a smartphone, a laptop, a tablet, a mobile device, or other device configured for communicating with the computing device 404.

In an aspect, the communication processing system 403 can manage the communication between the user device 402 and the computing device 404 via a database 414. As an example, the database 414 can store a plurality of files, user identifiers or records, or other information. For example, the database 414 can comprise a list of computing devices available for processing the communication request from the user device 402. As another example, the database 414 can comprise a list of computing devices available for routing the communication request to a computing device available for processing the communication request. The database 414 can be disposed remotely from the communication processing system 103, and accessed via direct or indirect connection. The database 413 can be integrated with the communication processing system 403 or some other device or system.

In an aspect, the computing device 404 can be associated with the database 413. As an example, the database 414 can store information relating to the user device 402, such as the address element 410 and/or the service element 411. As an example, the computing device 404 can obtain the device identifier 409 from the user device 402 and retrieve information from the database 413, such as the address element 410 and/or the service elements 411. As a further example, the computing device 404 can obtain the address element 410 from the user device 402 and can retrieve the service element 411 from the database 413, or vice versa. As another example, the database 413 can comprise performance metrics 412. Any information can be stored in and retrieved from the database 413. The database 413 can be disposed remotely from the computing device 404 and accessed via direct or indirect connection. The database 413 can be integrated with the computing system 404 or some other device or system.

In an aspect, communication management system 405 can be configured to monitor the performance of the computing device 404. The communication management system 405 can comprise a performance database 415 and a threshold database 416. For example, the performance database 115 can comprise performance metrics of the computing device 404. The performance metrics can refer to one or more of, a CPU status, a RAM status, a storage space status, number of active communication sessions, error messages associated with the computing device 404, and the like. The threshold database 416 can comprise predefined values for performance metrics stored in performance database 415. The communication management system 405 can update database 414 of the communication processing system 403 based on performance metrics stored in performance database 415 and the performance threshold stored in threshold database 416.

In an aspect, the communication processing system 403, computing device 404 and the communication system 405 can be implemented as separate network entities or reside in a common location. In the latter case, the communications among the communication processing system 403, the communication management system 405 and computing device 404 can be performed by way of internal functionality. For example, the communication can be made by sending internal messages, communicating via one or more communication protocols between devices through direct links, and the like.

As an example, the computing device 404 can include a publication element 417 to create an appropriate publication message upon the performance metrics of the computer device 404 exceeding a predefined performance threshold (e.g., CPU utilization has exceeded 70% of full capacity, number of active communication request has exceeded 20, RAM utilization has exceeded 80% of full capacity, etc.). The publication message can be provided to communication management system 405. In turn, the communication management system 405 can notify the present performance metrics to the communication processing system 403, and the database 414 can be updated accordingly.

Figure 7:
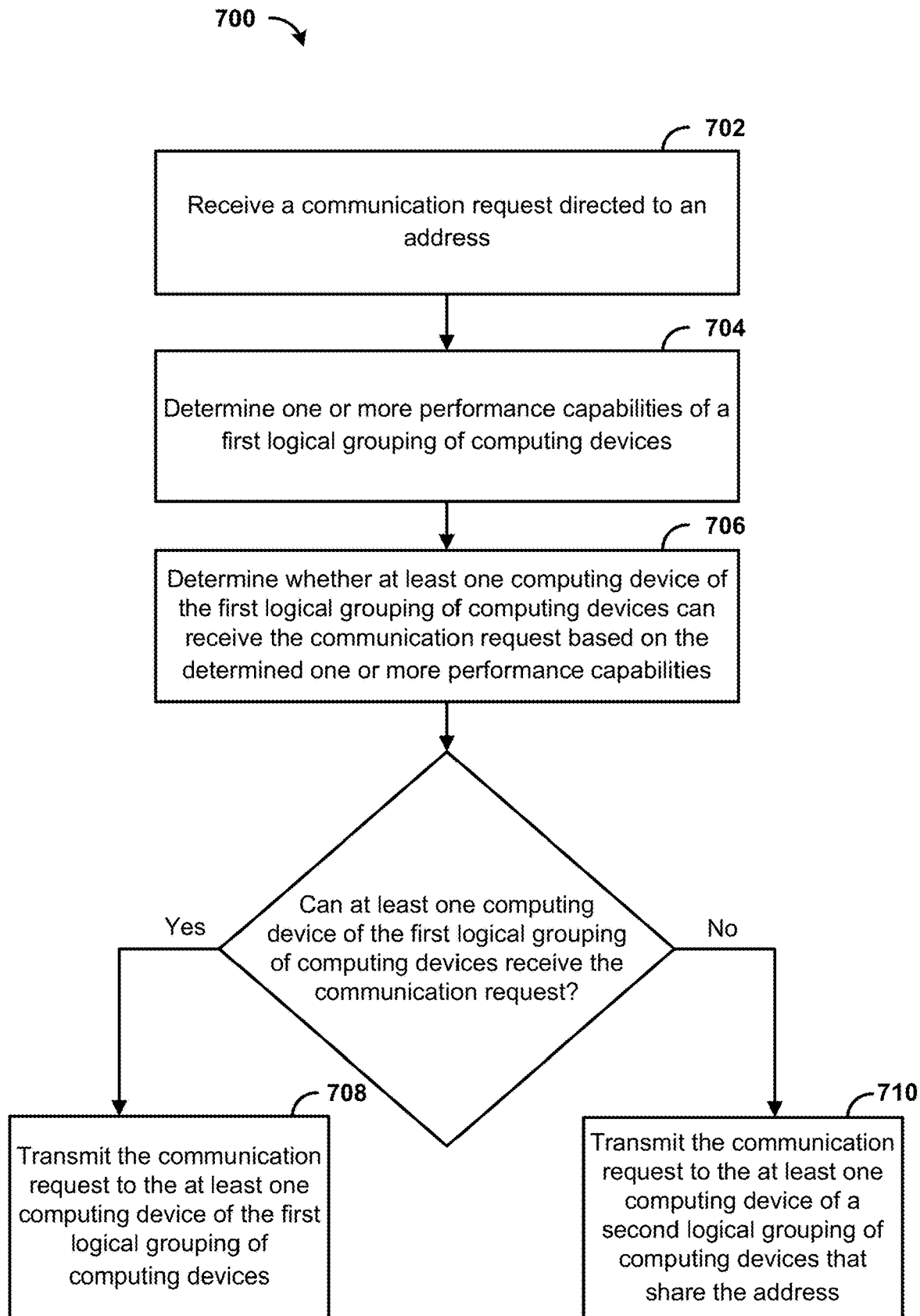
FIG. 7 is a flowchart illustrating an example method.

FIG. 7 is a flow chart illustrating an example method 700. At step 702, a communication request directed to an address can be received. The communication request can comprise one or more of: an internet telephone call, a multimedia distribution, a multimedia conference, a presentation, and the like. In an aspect, the communication processing system 403 can receive a communication request from a user device (e.g., user device 402). As an example, the user device can comprise a computer, a telephone, a VoIP phone, a smartphone, a laptop, a tablet, a mobile device, and/or the like. In an aspect, the communication request can be directed to an address (e.g., IP address), wherein the address is shared among a logical grouping of computing devices (e.g., first logical grouping of computing devices 404a,b,c,d). In an aspect, each computing device of the first logical grouping of computing devices is associated with a respective device identifier, for example, media access control (MAC) addresses. The logical grouping of computing devices 404a, b,c,d can operate as servers, a gateway nodes, data management units, and/or the like. In an aspect, the first logical grouping of computing devices can be configured to be the primary cluster to process a communication request from the user device 420. Examples of a communication request can be a voice call, a video call, video conferencing, streaming multimedia distribution, instant messaging, presence information, file transfer, fax over IP, and the like.

At step 704, one or more performance capabilities of a first logical grouping of computing devices can be determined. For example, the one or more performance capabilities can be determined by determining one or more performance metrics of the first logical grouping of computing devices. Performance metrics can comprise one or more of utilization status of a central processing unit (CPU), a memory, a storage space, a number of active communication requests in process, and an error message. The communication request can be received via a session initiation protocol (SIP). The communication request can be associated with a communication session identifier. In an aspect, the communication processing system 403 can determine one or more performance capabilities of the first logical grouping of computing devices 404a,b,c,d via communication with the communication management system 405. For example, the communication management system 405 can receive one or more performance metrics of the first logical grouping of computing devices, and compare the one or more performance metrics with a predefined performance threshold stored in database 414. The communication management system 405 can communicate with the communication processing system 403 to update one or more performance capabilities of the first logical grouping of computing devices 404a,b,c,d. For example, when a performance threshold is exceeded, one or more performance capabilities of a computing device can be changed from one category to another category. For example, a list of computing devices can be categorized as available for processing the communication request, a list of computing devices can be categorized as available for routing the communication request to a computing device available for processing the communication request, and a list of computing devices can be categorized as not available for processing or routing the communication request.

At step 706, it can be determined whether at least one computing device of the first logical grouping of computing devices can receive the communication request, based on the determined one or more performance capabilities. In an aspect, if at least one computing device of the first logical grouping of computing devices can receive the communication request, the communication request can be transmitted to the at least one computing device of the first logical grouping of computing devices at step 708. If at least one computing device of the first logical grouping of computing devices cannot receive the communication request, the communication request can be transmitted to a second logical grouping of computing devices that share the address at step 710. In an aspect, the second logical grouping of computing devices does not share the address. In an aspect, determining whether at least one computing device of the first logical grouping of computing devices can receive the communication request can comprise determining a list of computing devices available for processing the communication request, determining a list of computing devices available for routing the communication request to a computing device available for processing the communication request, determining a list of computing devices not available for processing or routing the communication request, a combination thereof, and the like. In an aspect, the first logical grouping of computing devices can be located at a first geographical location, and the second logical grouping of computing devices can be located at a second geographical location.

Figure 8:
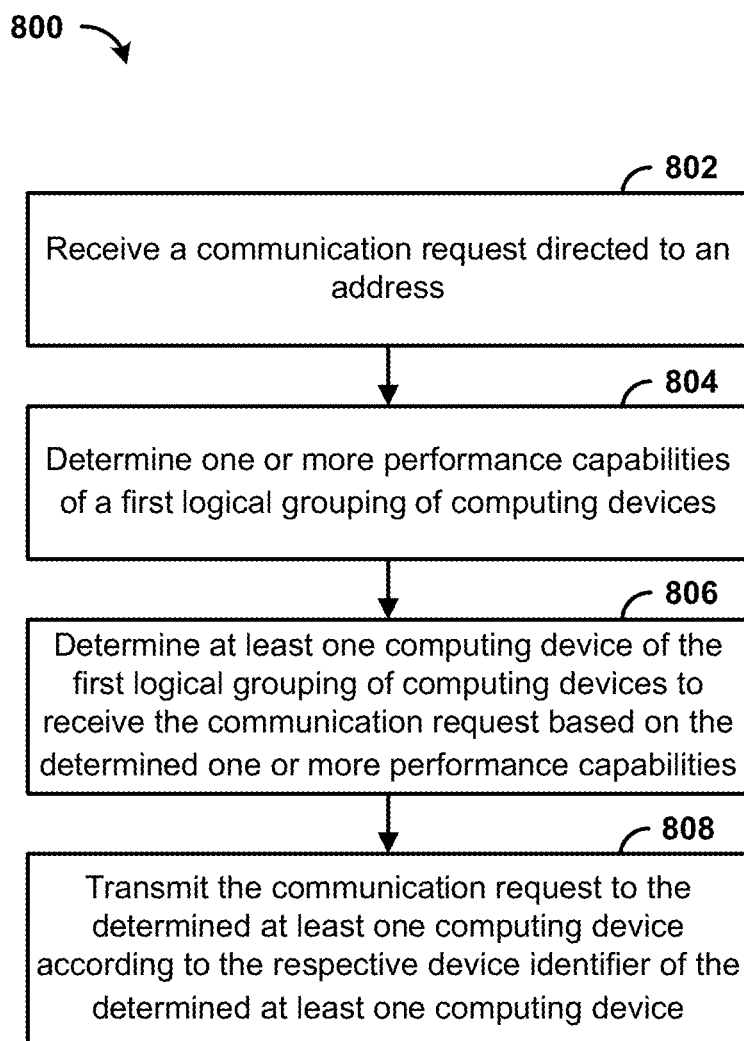
FIG. 8 is a flowchart illustrating another example method.

FIG. 8 is another flow chart illustrating an example method 800. At step 802, a communication request directed to an address can be received. The communication request can comprise one or more of: an internet telephone call, a multimedia distribution, a multimedia conference, and a presentation. The communication request can be received via a session initiation protocol (SIP). The communication request is associated with a communication session identifier. In an aspect, a user device 402 can transmit the communication request to a communication processing system 403 to an address (e.g., an IP address). The communication processing system 403 can determine a computing device (e.g., computing device 404a) in a first logical grouping of computing devices 404a,b,c,d that share the address. For example, the computing device 404a that receives the communication request can become an active computing device. As an example, the user device 402 can be a computer, a telephone, a VoIP phone, a smartphone, a laptop, a tablet, a mobile device, and/or the like. In an aspect, the first logical grouping of computing devices 404a,b,c,d can operate as servers, gateway nodes, data management units, and/or the like. Examples of a communication request can be a voice call, a video call, video conferencing, streaming multimedia distribution, instant messaging, presence information, file transfer, fax over IP, and the like.

At step 804, one or more performance capabilities of a first logical grouping of computing devices can be determined, wherein the first logical grouping of computing devices share the address, and wherein each computing device of the first logical grouping of computing devices is associated a respective device identifier. Determining one or more performance capabilities of a first logical grouping of computing devices can comprise determining one or more performance metrics of the first logical grouping of computing devices. In an aspect, the performance metrics can comprise one or more of utilization status of a central processing unit (CPU), a memory, a storage space, a number of active communication requests in processing, and an error message. The device identifiers can comprise media access control (MAC) addresses. Determining one or more performance capabilities of a first logical grouping of computing devices can comprise communicating with a communication management system, wherein the communication management system is configured to receive the one or more performance metrics of the first logical grouping of computing devices. In an aspect, the active computing device 404a can determine one or more performance capabilities of the first logical grouping of computing devices. For example, one or more performance metrics of the first logical grouping of computing devices 404a,b,c,d can be exchanged on a regular basis (e.g., on a heartbeat). The exchanged information can be stored in the databases 413a,b,c,d associated with the respective computing devices 404a,b,c,d. The active computing device 404a can receive information stored in the databases 413a,b,c,d. The one or more performance metrics can be compared with the performance thresholds. When a performance threshold is exceeded, one or more performance capabilities of a computing device can be change from one category to another category. For example, a list of computing devices can be categorized as available for processing the communication request, a list of computing devices can be categorized as available for routing the communication request to a computing device available for processing the communication request, and a list of computing devices can be categorized as not available for processing or routing the communication request.

At step 806, the method can determine at least one computing device of the first logical grouping of computing devices to receive the communication request based on the determined one or more performance capabilities. For example, the active computing device 404a can have a list of computing devices available for processing the communication request, a list of computing devices available for routing the communication request to a computing device available for processing the communication request, and a list of computing devices not available for processing or routing the communication request. For example, at least one computing device available for processing the communication request (e.g., 404b) can be determined to receive the communication request.

At step 808, the communication request can be transmitted to the determined at least one computing device according to the respective device identifier of the determined at least one computing device. For example, the first logical grouping of computing devices 404a,b,c,d can be associated with respective device identifiers such as a media access control (MAC) address. Therefore, the communication request can be transmitted to the at least one computing device determined at step 806 according to the respective MAC address. Accordingly, the at least one computing device that receives the communication request (e.g., 404b) can become an active computing device. The active computing device 404b can determine a next computing device to process or route the communication. Therefore, the communication can be routed and/or processed from one computing device to another computing device until the communication request can be transmitted to its destination.

Figure 9:
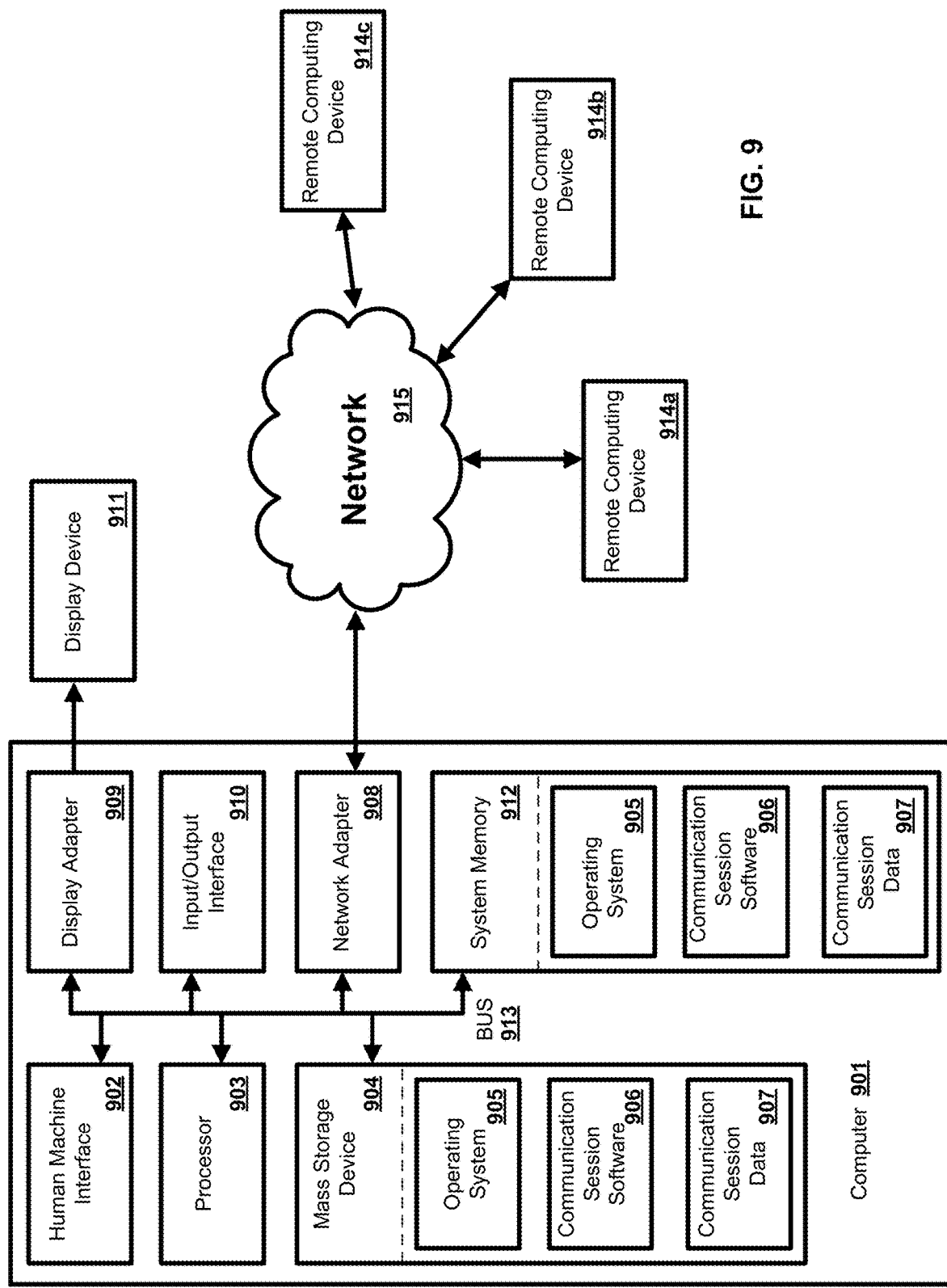
FIG. 9 is a block diagram illustrating an example computing device in which the present methods and systems can operate.

FIG. 9 is a block diagram illustrating an exemplary operating environment for performing the disclosed methods. In an exemplary aspect, the methods and systems of the present disclosure can be implemented on computer 901 as illustrated in FIG. 9 and described below. By way of example, user device 402 or computing devices 404a,b,c,d in FIG. 4 and FIG. 5 can be computer 901 as illustrated in FIG. 9. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the processor 903 to the system memory 912. In the case of multiple processors 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, communication session software 906, communication session data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data, such as communication session data 907, and/or program modules, such as operating system 905 and communication session software 906, that are immediately accessible to and/or are presently operated on by the processor 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and communication session software 906. Each of the operating system 905 and communication session software 906 (or some combination thereof) can comprise elements of the programming and the communication session software 906. Communication session data 907 can also be stored on the mass storage device 904. Communication session data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processor 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914*a,b,c*. By way of example, a remote computing device can be a personal computer, portable computer, smartphone, a server, a router, a network computer, a peer device or other common network node, and so on. Logical connections between the computer 901 and a remote computing device 914*a,b,c* can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905 are illustrated herein as discrete blocks, although it is recognized that such programs and components reside at various times in different storage components of the computing device 901, and are executed by the data processor(s) of the computer. An implementation of communication session software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a communication processing system, a communication request directed to an address;
   determining a performance capability for one or more computing devices of a first logical grouping of computing devices, wherein each computing device of the first logical grouping of computing devices is associated with a respective device identifier;
   determining, based on the performance capability, a computing device of the first logical grouping of computing devices to process the communication request; and
   sending, to the determined computing device based on the respective device identifier of the determined computing device, the communication request.

2. The method of claim 1, wherein the communication request comprises a request to communicate via Voice over Internet Protocol (VoIP).

3. The method of claim 1, wherein the communication request is received from one or more of a VoIP enabled computer, a VoIP phone, or a VoIP adapter.

4. The method of claim 1, wherein the performance capability is determined based on a performance metric comprising one or more of a utilization of a central processing unit (CPU), a utilization of a memory, a storage space, a number of active communication requests in processing, or an error message.

5. The method of claim 1, further comprising:
   determining whether at least one computing device of a second logical grouping of computing devices can process the communication request; and
   wherein the communication request is sent to the determined computing device of the first logical grouping of computing devices based on no computing device of the second logical grouping of computing devices being capable of processing the communication request.

6. The method of claim 4, further comprising determining, based on a performance metric associated with one or more computing devices of a second logical grouping of computing devices, a respective performance capability for the one or more computing devices of the second logical grouping of computing devices.

7. The method of claim 4, further comprising receiving, from a communication management system, one or more performance metrics of each computing device of a second logical grouping of computing devices.

8. An apparatus, comprising:
   one or more processors; and
   memory storing processor executable instructions that, when executed by the one or more processors, cause the apparatus to:
   receive a communication request directed to an address;
   determine a performance capability for one or more computing devices of a first logical grouping of computing devices, wherein each computing device of the first logical grouping of computing devices is associated with a respective device identifier;
   determine, based on the performance capability, a computing device of the first logical grouping of computing devices to process the communication request; and
   send, to the determined computing device based on the respective device identifier of the determined computing device, the communication request.

9. The apparatus of claim 8, wherein the communication request comprises a request to communicate via Voice over Internet Protocol (VoIP).

10. The apparatus of claim 8, wherein the communication request is received from one or more of a VoIP enabled computer, a VoIP phone, or a VoIP adapter.

11. The apparatus of claim 8, wherein the performance capability is determined based on a performance metric comprising one or more of a utilization of a central processing unit (CPU), a utilization of a memory, a storage space, a number of active communication requests in processing, or an error message.

12. The apparatus of claim 8, wherein the processor executable instructions, when executed by the one or more processors, further cause the apparatus to:
    determine whether at least one computing device of a second logical grouping of computing devices can process the communication request; and
    wherein the apparatus is configured to send the communication request to the determined computing device of the first logical grouping of computing devices based on no computing device of the second logical grouping of computing devices being capable of processing the communication request.

13. The apparatus of claim 12, wherein the processor executable instructions, when executed by the one or more processors, further cause the apparatus to determine, based on a performance metric associated with one or more computing devices of the second logical grouping of computing devices, a performance capability for the one or more computing devices of the second logical grouping of computing devices.

14. The apparatus of claim 12, wherein the processor executable instructions, when executed by the one or more processors, further cause the apparatus to receive, from a communication management system, one or more performance metrics of each computing device of the second logical grouping of computing devices.

15. A system, comprising:
    a first logical grouping of computing devices, wherein each computing device of the first logical grouping of computing devices is associated with a respective device identifier; and
    a communication processing system in communication with the first logical grouping of computing devices, wherein the communication processing system is configured to:
    receive a communication request directed to an address;
    determine a performance capability for one or more computing devices of the first logical grouping of computing devices, wherein each computing device of the first logical grouping of computing devices is associated with a respective device identifier;
    determine, based on the performance capability, a computing device of the first logical grouping of computing devices to process the communication request; and
    send, to the determined computing device based on the respective device identifier of the determined computing device, the communication request.

16. The system of claim 15, wherein the communication request comprises a request to communicate via Voice over Internet Protocol (VoIP), and wherein the communication request is received from one or more of a VoIP enabled computer, a VoIP phone, or a VoIP adapter.

17. The system of claim 15, wherein the performance capability is determined based on a performance metric comprising one or more of a utilization of a central processing unit (CPU), a utilization of a memory, a storage space, a number of active communication requests in processing, or an error message.

18. The system of claim 15, wherein the communication processing system is further configured to:
 determine whether at least one computing device of a second logical grouping of computing devices can process the communication request; and
 wherein the communication processing system is configured to send the communication request to the determined computing device of the first logical grouping of computing devices based on no computing device of the second logical grouping of computing devices being capable of processing the communication request.

19. The system of claim 18, wherein the communication processing system is further configured to determine, based on a performance metric associated with one or more computing devices of the second logical grouping of computing devices, a performance capability for the one or more computing devices of the second logical grouping of computing devices.

20. The system of claim 15, wherein the communication processing system is further configured to receive, from a communication management system, a performance metric associated with one or more computing devices of the first logical grouping of computing devices.

21. The method of claim 1, wherein the performance capability comprises a category indicative of an availability of the first logical grouping of computing devices.

22. The apparatus of claim 8, wherein the performance capability comprises a category indicative of an availability of the first logical grouping of computing devices.

23. The system of claim 15, wherein the performance capability comprises a category indicative of an availability of the first logical grouping of computing devices.

* * * * *